United States Patent [19]

Schuster-Woldan et al.

[11] 4,447,292
[45] May 8, 1984

[54] METHOD FOR MANUFACTURING UNSUPPORTED METAL LATTICE STRUCTURES

[75] Inventors: Hans Schuster-Woldan, Woerthsee/Steinebach; Hermann Buerk, Maisach; Dirk Koch, Augsburg; Kaspar Weingand, Gmund, all of Fed. Rep. of Germany

[73] Assignee: Siemens Aktiengesellschaft, Berlin & Munich, Fed. Rep. of Germany

[21] Appl. No.: 455,595

[22] Filed: Jan. 4, 1983

[30] Foreign Application Priority Data

Feb. 9, 1982 [DE] Fed. Rep. of Germany ....... 3204425

[51] Int. Cl.$^3$ .......................... C23F 1/02; B44C 1/22; C03C 15/00; C03C 25/06
[52] U.S. Cl. .................................. 156/644; 156/652; 156/656; 156/659.1; 156/661.1; 204/15; 430/317; 430/318
[58] Field of Search .................... 204/11, 15; 156/644, 156/656, 659.1, 661.1, 652, 629, 634; 430/313-318

[56] References Cited

U.S. PATENT DOCUMENTS

| | | |
|---|---|---|
| 4,058,432 | 11/1977 | Schuster-Woldan et al. |
| 4,164,059 | 8/1979 | Van Esdonk .................. 29/25.15 |
| 4,240,869 | 12/1980 | Diepers ........................... 156/643 |
| 4,341,591 | 7/1982 | Tamutus .......................... 156/630 |

Primary Examiner—William A. Powell
Attorney, Agent, or Firm—Hill, Van Santen, Steadman & Simpson

[57] ABSTRACT

A method for manufacturing unsupported metal lattice structures, such as nickel lattices for use as micro-flow sensors in gas analysis devices, employs the steps of two-sided vacuum metallization on a substrate, several photoresist steps, an electroplating step, and an etching step. A number of units can be produced by this method on a single substrate.

4 Claims, 6 Drawing Figures

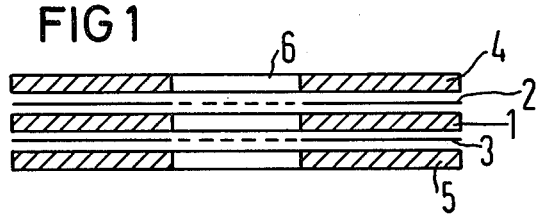
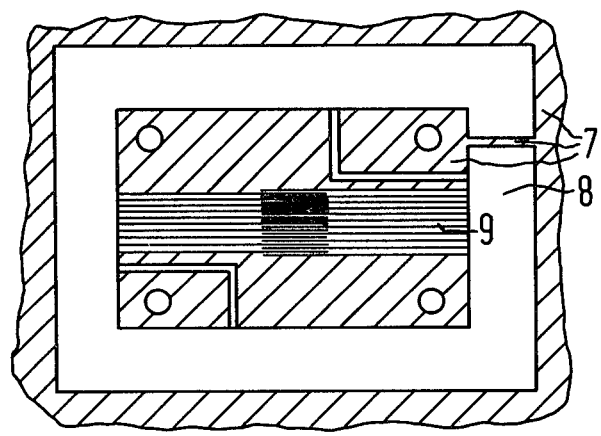
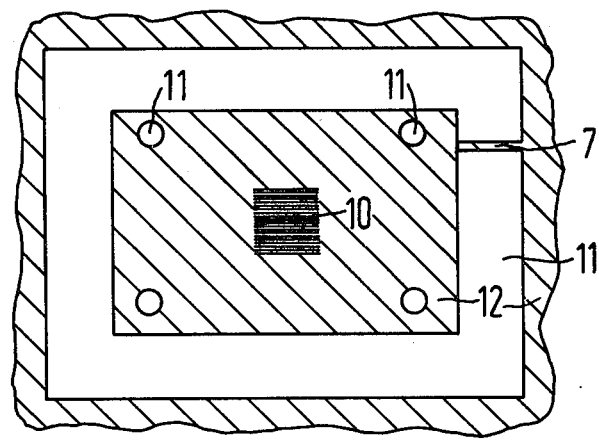

METHOD FOR MANUFACTURING UNSUPPORTED METAL LATTICE STRUCTURES

BACKGROUND OF THE INVENTION

1. Field of the Invention

The present invention relates to a method for manufacturing unsupported metal lattice structures, and in particular to such a structure for generating a nickel lattice for use as a micro-flow sensor in gas analysis devices.

2. Description of the Prior Art

A method for manufacturing unsupported thin metal structures, such as lattices, is described in German Pat. No. 2,512,086 wherein an electroplated cover is applied to a carrier and the metal structures are built up by means of metal electro-deposition and are received in a carrying frame.

Such unsupported thin metal structures may be utilized as masks in electron lithography and x-ray shadow reproduction, or as thin film aperture diaphragms for corpuscular beam devices. A further use for such structures is to undertake resistance measurement in gas detecting devices, such devices requiring ultra-fine unsupported metal lattices. Because the structural dimensions of such lattices usually are in the micron range, manufacture and manipulation of such structures is extremely difficult.

An example of a conventional such lattice structure is shown in FIG. 1 which does in fact meet the high structural demands, but which is difficult to manufacture and as a result a high number of rejects occur in a typical manufacturing run. This conventional lattice structure is manufactured by means of soldering two separate nickel lattices between three ultrasonically bored glass laminae coated with glass solder. Nickel lattices 2 and 3 are thus produced at each side of a spacing glass 1. The module is closed by cover glasses 4 and 5. The bored opening is referenced at 6. The nickel lattices are galvano-plastically deposited on V2A steel plates and are drawn off as needed.

SUMMARY OF THE INVENTION

It is an object of the present invention to provide a method for manufacturing double lattices without the necessity of assembling a large number of individual parts.

The above object is inventively achieved in a method for manufacturing a lattice wherein a lattice pattern or structure is applied to both sides of an insulating carrier and subsequently a partial passage is generated in the carrier. This method has the advantage that separate construction of metal lattice structures is avoided as is the necessity of subsequently aligning those structures upon attachment to the substrate or carrier, such as is conventionally done by soldering with glass solder to form a sandwich structure.

In another embodiment of the invention, the lattice structures are generated in positions defined relative to each other on a glass carrier by means of combining the steps of two-sided vacuum coating or metallization, a number of photo technology steps, followed by electroplating steps and etching. This embodiment produces a double lattice structure wherein the lattices are already adjusted relative to one another.

In accordance with the principles of the present invention, the glass carrier is first coated with titanium and copper and those metal layers are subsequently coated with photoresist followed by a photoresist process whereby negative photoresist structures are first produced in the photoresist. Subsequently the metal structures are galvano-plastically applied and the remaining photoresist is removed. The complete surface is again coated with photoresist and subjected to a second photo technique process. The surfaces not coated with photoresist, and the metal structures, are etched free from the base metallization layers of titanium and copper, the desired passages in the glass are generated by etching, and the photoresist is finally completely removed. Subsequently the surfaces not occupied with metal structures are etched free of titanium and copper and remaining glass etching residue is stripped.

When manufacturing a number of metal structures from a single larger substrate, the individual parts are simultaneously etched free simultaneously with the step by means of which the passages in the substrate are etched, except for a narrow retaining stay. This permits a large number of individual parts or units to be produced on one substrate and subsequent optical and electrical checking is thus largely simplified. Many embodiments can be realized with significantly decreased time and material outlay.

As stated above, such fine metal structures may be employed as flow sensors in gas analysis devices. The method disclosed and claimed herein for manufacturing structures suitable for such use is to apply meandering or folded nickel lattices at both sides of a perforated glass lamina. Unsupported nickel stays are thus stretched over the opening in the glass lamina. The lattices represent electrical resistances. These are heated by the application of an electrical voltage thereto. When a gas to be measured flows through the measuring aperture, the lattices cool to different extents, and thus exhibit different changes in their respective electrical resistance. The difference of the resistance change is a measure of the gas flow. Such resistance difference can be indirectly determined in comparison with a reference voltage by means of a suitable bridge circuit.

As described in connection with FIG. 1, conventional detectors of this type comprised of a plurality of individually manufactured and subsequently assembled separate parts has several disadvantages which are not present in a detector manufactured in accordance with the principles of the present invention. The unsupported metal lattice structure useable as a micro-flow sensor for gas analysis devices constructed in accordance with the method disclosed herein generates a sensor in a compact unit with the lattices already aligned so as to require no further adjustment or handling.

In another embodiment of the invention, additional holes may be provided in each individual unit for serving as terminals, with contacting wires being introduced and soldered therein. The required metal conducting structure for such holes is provided in the photo technology mask.

DESCRIPTION OF THE DRAWINGS

FIG. 1 is a sectional view of a conventional sandwichtype metal lattice structure.

FIG. 2 is a plan view of an unsupported metal lattice structure being constructed in accordance with the principles of the present invention after galvanic-plastic precipitation of nickel on a substrate.

FIG. 3 is a plan view of the lattice structure shown in FIG. 2 after completion of the second photo technique process.

DESCRIPTION OF THE PREFERRED EMBODIMENTS

Figure 4:
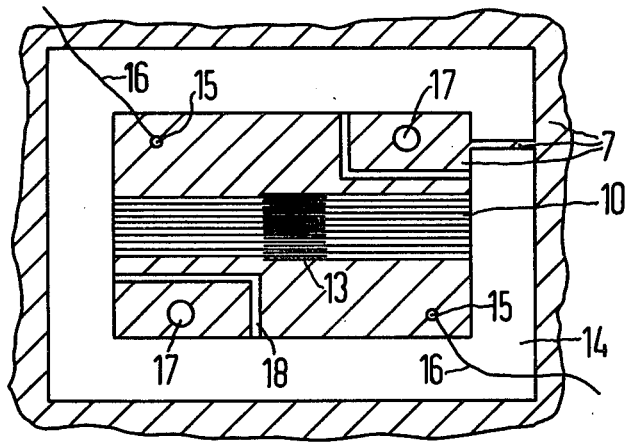
FIG. 4 is a plan view of the metal lattice structure shown in FIG. 3 after glass etching and after the second photoresist stripping.

Various steps in the manufacture of an unsupported metal lattice structure of the type which may be utilized as a micro-flow sensor in gas analysis devices are shown in FIGS. 2 through 4. Manufacture in accordance with the claimed method results in a compact module generated by means of combined photo technique and etching technique starting from a glass carrier metallized on both sides.

Figure 5:
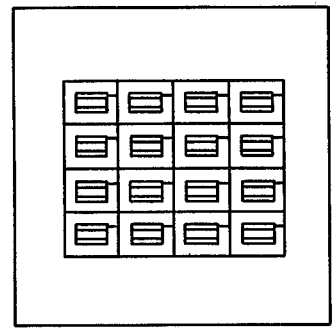
FIG. 5 is a plan view showing the arrangement of a number of individual lattice modules manufactured on the same carrier in accordance with the principles of the present invention.

The first step in the method is vapor-deposition of 50 nm titanium and 200 nm copper on both sides of a glass carrier having, for example, a format of 50×50 mm². This is followed by coating the sides with approximately 4 micrometers of positive photoresist by immersion followed by contact exposure with a pair of masks adjusted for congruence. As shown in FIG. 5, the masks may generate, for example, 16 individual modules on a single carrier. Photoresist development and galvanicplastic pricipatation of nickel sulphamate follow.

This last-described method step is shown in FIG. 2. In this and the following figures, visible nickel is referenced at 7, the photoresist is referenced at 8, and alternating stays of photoresist and nickel as indicated at 9. This step is followed by the step of photoresist removal or decoating, for example, with acetone. This step is followed by coating the resulting structure with approximately 5 micrometers of photoresist, followed by exposure with a pair of masks (which permit etching) adjusted for congruence and development of the photoresist.

An individual component after this last method step is shown in FIG. 3, wherein nickel is again referenced at 7 and the stays of nickel and copper are referenced at 10, visible copper is referenced at 11 and photoresist is referenced at 12.

The right angle segments shown in FIG. 2 (covered by photoresist 12 in FIG. 3) are electroplated with nickel to obtain good resist for the glass-etching process in order to achieve well defined holes 11. This also permits the contacting wires to be soldered on either side of the finished unit. The holes 11 are also covered with photoresist in FIG. 2.

Development of the photoresist is followed by etching the copper areas (the test aperture, the holes for contacting wires, and the edge) with chromic acid. This is followed by etching of titanium and glass (test aperture, holes for contacting wires and edge), preferably with 40% hydrofluoric acid by immersion. This is followed by photoresist removal, for example, with acetone.

A module after the last method step is shown in FIG. 4 wherein 7 again indicates nickel, 10 indicates nickel stays and copper, 13 indicates the unsupported nickel lattice and 14 indicates free-etched area. Contacting locations are referenced at 15, the lattice of the front side being connected to those areas by means of wires 16. Additional holes 17 for contacting wires (not illustrated) are present on the opposite side of the module. Interruption of the nickel surface is referenced at the right angle segment 18. The reference numeral 18 represents exposed glass, and 14 represents glass etched away.

After etching of copper (between the nickel stays outside of the test aperture) with chromic acid, there follows etching of titanium (between the nickel stays outside of the test aperture) with, for example, 20% hydrofluoric acid. Glass etching residues are dissolved with heated diluted sulphuric acid.

As stated above, a plan view of 16 multiple copies of an individual module on a single sheet is shown in FIG. 5 in actual size. For employment as a micro-flow sensor, the ohmic resistance of the nickel lattices is determined at the front and back side of the individual modules.

Figure 6:
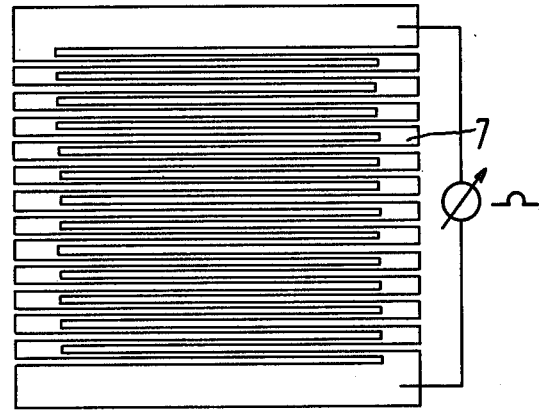
FIG. 6 is a plan view of a test opening for a micro-flow sensor for gas analysis devices having a metal lattice structure constructed in accordance with the principles of the present invention.

A plan view for a test aperture in an individual module is shown in FIG. 6 at a scale of approximately 50:1.

Variations in the lattice geometries can also be achieved by using photo technique and etching technique in a larger frame. Also, more than 16 individual modules may be prepared on a single carrier.

Although other modifications and changes may be suggested by those skilled in the art it is the intention of the inventors to embody within the patent warranted hereon all changes and modifications as reasonably and properly come within the scope of their contribution to the art.

We claim as our invention:

1. A method of manufacturing unitary unsupported metal lattice structures suitable for use as micro-flow sensors comprising the steps of:
    generating a metal lattice structure on opposite sides of an insulating carrier by vapor-depositing a metal layer on said opposite sides of said carrier and subsequently removing congruent selected portions of said metal layer on each of said opposite sides thereof by photolithography; and
    generating a passage in said carrier between said metal lattice structures by etching said carrier at selected locations.

2. The method of claim 1 comprising the additional step of generating a plurality of holes in said insulating carrier for contacting terminals on said opposite sides of said insulating carrier, and introducing contacting wires into said holes and soldering said wires therein.

3. The method of claim 1 wherein said insulating carrier consists of glass, and wherein said method is further defined by the steps of:
    coating said opposite sides of said insulating carrier with titanium and copper;
    covering said titanium and copper with photoresist and generating a negative structure in said photoresist;
    galvano-plastically applying a further metal structure to the exposed portions of said metal layer not covered by said photoresist;
    removing said photoresist;
    coating the exposed surfaces with second photoresist;
    exposing said second photoresist;
    etching surfaces of said titanium and copper layers not covered with said second photoresist or said metal structure so as to expose said insulating carrier therebeneath;

etching said passages in said insulating carrier at said exposed areas of said carrier;

removing said second photoresist; and removing said titanium and copper layers from areas of said insulating carrier not covered by said metal structure.

4. The method of claim 1 wherein a plurality of said metal lattice structures are generated side by side on a large insulating carrier and comprising the additional step of etching between adjacent metal lattice structures on said insulating carrier to separate said metal lattice structures.

* * * * *